Patented Sept. 29, 1936

2,056,104

UNITED STATES PATENT OFFICE 2,056,104

TREATMENT OF STARCHES

Richard Hueter, Haus Waldfrieden, Rosslau-in-Anhalt, Germany, assignor, by mesne assignments, to "Unichem" Chemikalien Handels A.-G., Zurich, Switzerland, a corporation of Switzerland No Drawing. Application December 7, 1933, Serial No. 701,348. In Germany December 15, 1932

18 Claims. (Cl. 127—32)

The present invention relates to starches and has for an object to provide an improved method of treating starch to render it suitable for use in adhesives and in other relations where the starch should be soluble or capable of swelling readily.

Starch for certain uses is converted into a more soluble form or a form in which it more readily absorbs water by treating it with an alkali or an alkali reacting solution, such as alkali hydroxides, carbonates, borides, phosphates, and the like, especially sodium-, potassium- or ammoniumhydroxide.

It has been discovered in accordance with the present invention that starches commonly used for such purposes including the potato, rice, corn and other vegetable starches can more effectively be converted into a form in which they are more soluble and more readily capable of swelling by absorbing water if they are treated not with alkali solutions alone as heretofore, but with solutions of alkali and organic alkali sulfate or sulfonate of fatty alcohols which are of soapy character.

The sulfates and sulfonates of saturated and unsaturated aliphatic alcohols having 6 or more carbon atoms in the molecule and of the naphthenic alcohols may be used effectively. Those aliphatic saturated and unsaturated sulfates of alcohols having approximately 12 to 18 carbon atoms in the molecule, as lauryl, myristyl, cetyl, stearyl, oleyl or mixtures of alcohols obtainable by the catalytic reduction of coco oil fatty acids or palm kernel oil fatty acids, are preferred.

The proportions of the alkali used may be substantially the same as heretofore used, that is to say, between 0.5% and 10% of the weight of the starch. The proportion of the sulfate or sulfonate may ordinarily be substantially less than that of the alkali, as, for example, between 0.1% and 2.5% of the weight of the starch and between 10 and 50% of the weight of the alkali.

The effects produced by the use of the sulfates or sulfonates apparently are due to the dispersing and penetrating properties of such materials whereby the starch is dispersed in the solution and better penetration of the alkali is obtained. The alkali may be used in a smaller proportion than in the case with starch treated merely with alkali alone. The product is much less subject to the formation of lumps.

The starch products obtained by treatment in accordance with the invention are also suitable and particularly advantageous for use in the finishing of textile materials and are considerably more effective for these purposes than starch treated merely with alkali solutions.

In this process the effect of the alkali upon the starch is particularly uniform probably on account of the wetting effect of the sulfates or sulfonates and the decomposition of the product is much less; probably partly because of the uniformity of the constitution of the product and perhaps partly because of the preservative action of the sulfates or sulfonates left in the starch. The starch products produced by this process may be used in a smaller proportion than in the case with starch treated merely with alkali alone.

Example 1

100 kg. of potato starch are mixed with an equivalent weight of water containing 2.5% of caustic soda and 0.8% of sodium lauryl sulfate and treated at a temperature approximating 20° C. for a period of half an hour. The mixture when cold is made homogeneous by means of grinding, kneading or the like, if necessary a sufficient amount of water being added to produce a fluid paste. The product may be dried on hot cylinders if desired for storage or use.

Example 2

50 kg. of rice starch are mixed with water containing in solution 1.2 kg. of sodium hydroxide and 0.3 kg. of sodium cetyl sulfonate to produce a fluid paste. The mixture is stirred or ground at usual temperature for a period of half an hour to make it homogeneous. If desired the finished paste may be dried on hot cylinders.

I claim:

1. The method of converting starch into a more soluble form or a form in which it more readily absorbs water which comprises treating the starch with an alkali in the presence of an alkali salt of a reaction product of sulfuric acid and a fatty alcohol.

2. The method of converting starch into a more soluble form or a form in which it more readily absorbs water which comprises treating the starch with an alkali in the presence of an alkali salt of a reaction product of sulfuric acid and an aliphatic alcohol having 6 or more carbon atoms in the molecule.

3. The method of converting starch into a more soluble form or a form in which it more readily absorbs water which comprises treating the starch with an alkali salt of a sulfuric acid ester of an aliphatic alcohol having 8 or more carbon atoms in the molecule.

4. The method of converting starch into a more soluble form or a form in which it more readily absorbs water which comprises treating the starch with an aqueous solution comprising an alkali and an alkali salt of a sulfuric acid ester of an aliphatic alcohol having 8 or more carbon atoms in the molecule, the proportion of the alkali to the alkali salt of the sulfuric acid ester being between 9 to 1 and 1 to 1.

5. The method of converting starch into a more soluble form or a form in which it more readily absorbs water which comprises treating the starch with an aqueous solution comprising an alkali and an alkali salt of a sulfuric acid ester of an aliphatic alcohol having 8 or more carbon atoms in the molecule, the proportion of the starch to the alkali salt of the sulfuric acid ester approximating between 1000 to 1 and 50 to 1.

6. The method of converting starch into a more soluble form or a form in which it more readily absorbs water which comprises treating the starch with an aqueous solution of an alkali and an alkali sulfate of an aliphatic alcohol having approximately 12 to 18 carbon atoms in the molecule, the ratio of the starch, alkali and sulfate approximating 100:2.5:0.8.

7. The method of converting starch into a more soluble form or a form in which it more readily absorbs water which comprises treating the starch with an alkali in the presence of water soluble salt of a sulfuric acid ester of an aliphatic alcohol having 6 or more carbon atoms in the molecule.

8. The method of converting starch into a more soluble form or a form in which it more readily absorbs water which comprises treating the starch with an aqueous solution containing an alkali and an alkali sulfate of a fatty alcohol containing 8 or more carbon atoms in the molecule.

9. The method of converting starch into a more soluble form or a form in which it more readily absorbs water which comprises treating the starch with an aqueous solution containing an alkali and an alkali sulfate of a fatty alcohol containing approximately 12 to 18 carbon atoms in the molecule.

10. The product of the process defined in claim 1.

11. The product of the process defined in claim 7.

12. The method of converting starch into a more soluble form or a form in which it more readily absorbs water which comprises treating the starch with an aqueous solution containing caustic soda and sodium lauryl sulfate, the weight of the sulfate approximating 10 to 50% of the weight of the caustic soda.

13. The method of converting starch into a more soluble form or a form in which it more readily absorbs water which comprises treating the starch with an alkali in the presence of an alkali salt of a reaction product of sulfuric acid and an alcohol of the group consisting of the aliphatic alcohols having 6 or more carbon atoms in the molecule and naphthenic alcohol.

14. The method of converting starch into a more soluble form or a form in which it more readily absorbs water which comprises treating the starch with an alkali in the presence of an alkali salt of a reaction product of sulfuric acid and the mixture of alcohols obtained by catalytic reduction of coco-oil fatty acids.

15. The method of converting starch into a more soluble form or a form in which it more readily absorbs water which comprises treating the starch with an alkali in the presence of an alkali salt of a reaction product of sulfuric acid and an aliphatic alcohol having approximately 12 to 18 carbon atoms in the molecule.

16. A composition of matter consisting of the conversion product of starch reacted with an alkali and an alkali salt of a sulfuric acid ester of an alcohol having 8 or more carbon atoms in the molecule.

17. The method of converting starch into a more soluble form or a form in which it more readily absorbs water which comprises treating the starch with an aqueous solution containing an alkali and a water soluble sulfonate of a fatty alcohol containing 8 or more carbon atoms in the molecule.

18. The method of converting starch into a more soluble form or a form in which it more readily absorbs water which comprises treating the starch with an aqueous solution containing an alkali and a water soluble sulfonate of a fatty alcohol containing approximately 12 to 18 carbon atoms in the molecule.

RICHARD HUETER.